L. D. WOODRUFF.
INTERCHANGE COUPLING DEVICE.
APPLICATION FILED JUNE 7, 1916.

1,282,715.

Patented Oct. 22, 1918.
2 SHEETS—SHEET 1.

Witness
Edward White
M. B. Crandell

Inventor
Leonidas D. Woodruff
By Church & Church
his Attorneys

L. D. WOODRUFF.
INTERCHANGE COUPLING DEVICE.
APPLICATION FILED JUNE 7, 1916.
1,282,715.
Patented Oct. 22, 1918.
2 SHEETS—SHEET 2.
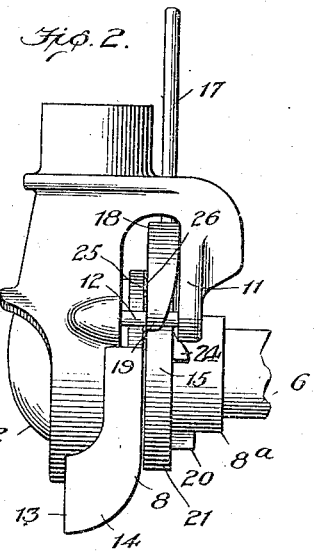
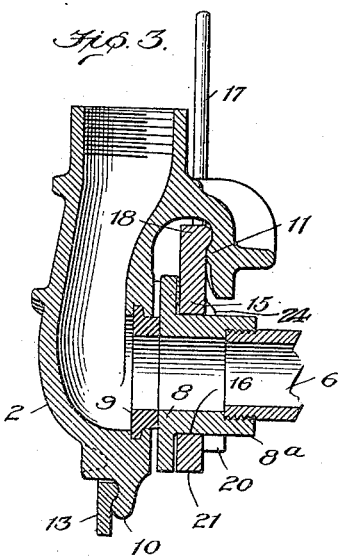
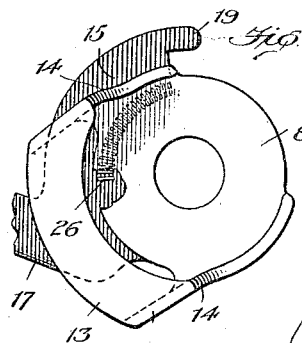
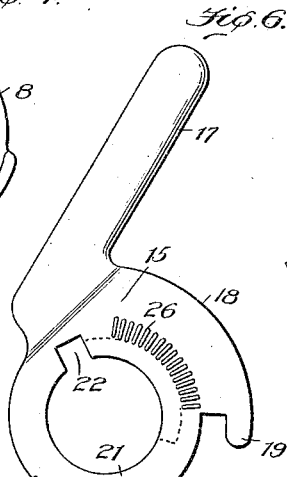
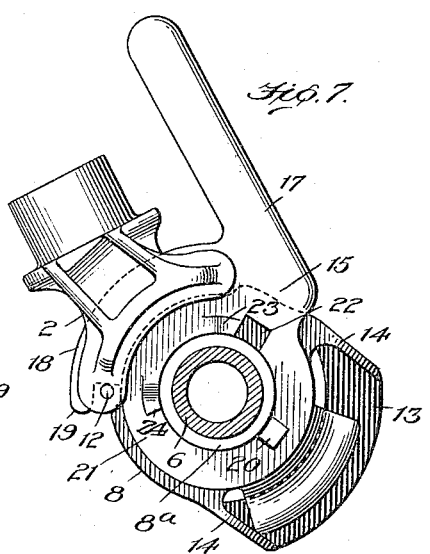
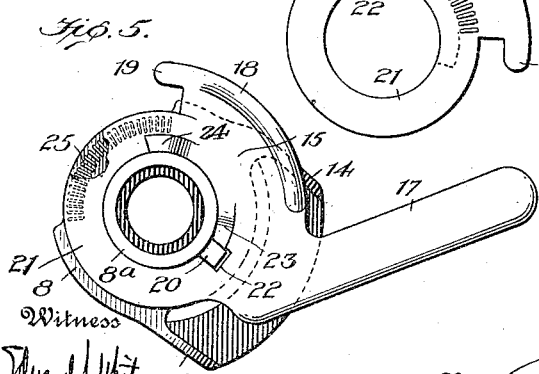

UNITED STATES PATENT OFFICE.

LEONIDAS D. WOODRUFF, OF NEWPORT, KENTUCKY.

INTERCHANGE COUPLING DEVICE.

1,282,715.  Specification of Letters Patent.  Patented Oct. 22, 1918.

Application filed June 7, 1916. Serial No. 102,334.

*To all whom it may concern:*

Be it known that I, LEONIDAS D. WOODRUFF, a citizen of the United States, residing at Newport, in the county of Campbell and State of Kentucky, have invented certain new and useful Improvements in Interchange Coupling Devices; and I do hereby declare the following to be a full, clear, and exact description of the same, reference being had to the accompanying drawings, forming part of this specification.

This invention relates to an interchange coupling device for permitting ready and quick coupling of the air, steam, or other pipe lines of a car equipped with an automatic train pipe coupling to a car not equipped with an automatic train pipe coupling.

The primary object of the present invention is the provision of an improved construction of interchange coupling device which insures the ordinary hand pipe coupling half section being firmly clamped with an automatic pipe coupling half section when the latter is in use, and also permits quick and easy detachment of the hand operated coupling from the automatic coupling when the car provided with the automatic train pipe coupling is to be coupled with an adjacent car not so equipped.

Other objects of the invention will appear from the ensuing detailed description, when taken in connection with the accompanying drawings which illustrate a structural embodiment of the invention in a preferred form. The novel features of the invention will be particularly pointed out and specified in the claims at the end of the specification.

In the drawings:—

Fig. 2 is a side view of an improved interchange coupling device coupled with an ordinary hand operated pipe coupling half section.

Fig. 3 is a vertical section taken through the coupled parts shown in Fig. 2.

Fig. 4 is a top plan view of the interchange coupling device.

Fig. 5 is a bottom plan view of the same.

Fig. 6 is a top plan view of the manually operated locking lever.

Fig. 7 is a bottom plan view of the seat at the end of the pipe section coupled with the automatic train pipe coupling half section.

Like characters of reference in the several figures indicate the same parts.

Figure 1:
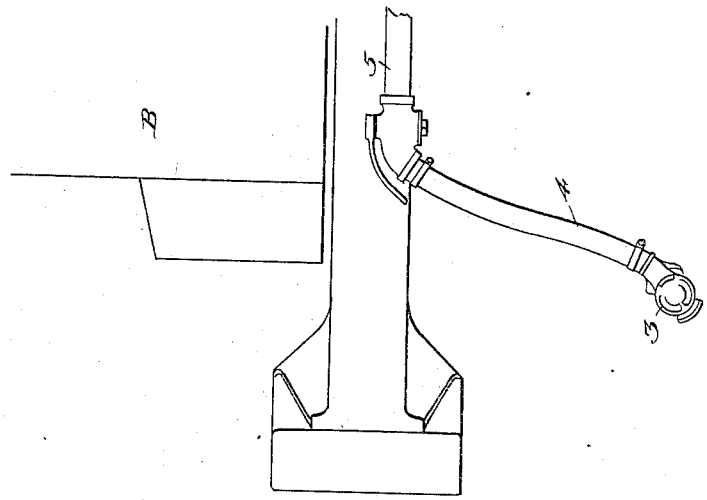
Figure 1 is a side elevation of the end portions of two adjacent cars in position for coupling, one of the cars being equipped with an automatic train pipe coupling and an interchange coupling device constructed in accordance with the present improvements, and the other car having only the usual flexible hose connection attached to an ordinary hand operated pipe coupling half section.
Figure 1:
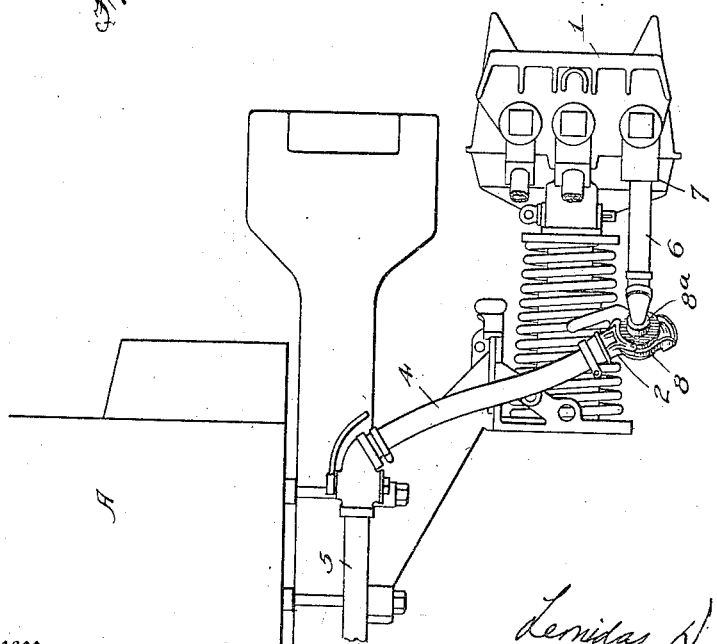

In the construction illustrated in Fig. 1 of the drawings, the car indicated diagrammatically at A is equipped with an automatic pipe coupling half-section 1, preferably of the type disclosed in my co-pending application, filed December 10, 1915, Serial No. 66,178, and the automatic coupling 1 is adapted to be coupled with the ordinary hand operated pipe coupling half section 2, of the car A by means of the improved interchange coupling device of the present invention. It will be understood, however, that the invention is not limited to the application herein illustrated but may be readily applied to other types of automatic couplings as well. The adjacent car indicated at B, Fig. 1, is equipped only with an ordinary hand operated pipe coupling half section 3, and the pipe lines of the car B are intended to be coupled with the pipe lines of the car A, in the manner which will appear hereinafter. In the usual construction, each car is equipped with three pipe lines, these being respectively the air, signal and heat lines of the car, but, to simplify the illustration, only one pipe line of each car A, B, is shown in the drawing. Both hand operated coupling half sections 2 and 3 of the cars A and B are attached to flexible hose 4, leading to the train pipes 5.

The preferred construction of interchange coupling device is illustrated in detail in Figs. 2 to 6, inclusive, and, as shown, a pipe section 6 is provided which is adapted to be screwed into a socket 7 of the automatic coupling 1, the pipe section 6 being attached to the automatic coupling in Fig. 1. This pipe section 6 is provided with a seat 8 mounted on a shank 8$^a$ screwed onto pipe section 6, the seat 8 being for the purpose of engaging the gasket 9 of a hand operated coupling half section 2 or 3. The hand operated coupling 2 or 3 is of the usual construction, having opposed outer and inner locking flanges numbered, respectively, 10 and 11. Inner locking flange 11 is spaced outwardly from the gasket 9 in the usual manner of couplings of this type and is connected to the main body portion of the hand operated coupling half section by means of a pin 12. For engaging one of the locking flanges of the hand operated coupling, preferably the outer flange 10, the seat 8 is provided with a fixed locking flange 13, the latter being supported away from the plane of the seat by side bracket arms 14 connecting the flange 13 with the seat, and so positioned that, when the gasket 9 of a hand operated coupling is brought into engagement with the seat 8, the outer locking flange 10 of said coupling will engage and interlock with the fixed locking flange 13, in the manner illustrated more particularly in Fig. 3.

For locking the hand operated coupling on the seat 8, a movable locking lever device 15 is provided. This lever device has a central circular opening 16 through which the shank $8^a$ of seat 8 projects and the lever device is located just behind seat 8, as shown more particularly in Fig. 3. Said lever-device 15 is provided with a handle 17 permitting a rotary movement around the shank $8^a$ and a locking flange 18 adapted to engage and interlock with the inner locking flange 11 of the hand operated coupling. When the lever 15 is rotated to the position shown in Fig. 4, the hand operated coupling may be applied to the seat 8, with the outer locking flange 10 of said coupling slipped into interlocking engagement with the fixed locking flange 13 on the seat 8. By a partial rotation of the lever device 15, the flange 18 of said lever device is brought into clamping engagement with the inner flange 11 of the hand operated coupling so that the gasket 9 is pressed into a tight joint on the seat 8. To assist in holding the lever 15 in coupling position, the said lever is provided with a hook 19 formed at the outer end of flange 18 and adapted to engage the pin 12 of the hand operated coupling. When moving the lever 15 into locking position, the hand operated coupling is prevented from rotary displacement on the seat 8, by the engagement of the sides of the outer flange 10 of said coupling with the bracket arm 14 of the locking flange 13.

The lever device 15 is held in position with respect to the seat 8 by means of a lug 20 projecting from the shank $8^a$ and positioned behind the lever as shown in Fig. 3. The ring portion 21 of the lever device 15 is provided with a slot 22 adapted to register with the lug 20, when the lever is rotated to a position remote from coupling position. Projecting from the ring portion 21 of the lever is a lug 23 adapted to engage a second lug 24 on shank $8^a$ and limit the movement of the lever, when moving the latter into its disengaging position. It will be evident that, by unscrewing the shank $8^a$ from pipe section 6 the lever may be readily slipped off the end of the shank remote from the seat 8 by rotating it into the position wherein slot 22 registers with lug 20.

The invention provides means for locking the lever in its coupling position when the gasket of a hand operated coupling is in coupled engagement with the seat 8 of pipe section 6. For this purpose, the inner face of seat 8 opposite to locking flange 13, as viewed in Fig. 3, is provided with a locking surface, adapted to be engaged by a similar or corresponding locking surface on the ring portion 21 of the lever, when the latter is moved into coupling position. The preferred form of these locking surfaces is illustrated in Figs. 5 and 6, wherein the inner face of seat 8 and outer face of ring portion 21 are respectively provided with corrugated surfaces 25 and 26. As shown in Fig. 2, movement of the lever 15 brings the corrugated surface 26 into engagement with corrugated surface 25, this engagement being effected by reason of the engagement of locking flange 18 with inner locking flange 11 of the hand operated coupling. It will be noted that the locking surfaces 25 and 26 are so positioned that pressure within the head of a hand operated coupling tending to disengage the coupling from the seat 8 will only act to more tightly force locking flange 11 of the coupling into contact with locking flange 18 of the lever, and thereby tightly jam the locking surfaces 25 and 26 together to prevent any displacement of the lever from its coupling position.

From the foregoing description, it will be understood that a hand operated coupling may be readily connected with and disconnected from the pipe section 6 of the automatic coupling 1 by a partial rotary movement of the lever 15. When it is necessary to couple a car provided with an automatic coupling to an adjacent car not so equipped, as in Fig. 1, the hand operated coupling 2 of car A will be disconnected from pipe section 6 and coupled up in the usual manner with the hand operated coupling 3 of car B.

What is claimed is:—

1. An interchange coupling device comprising a pipe section having a seat adapted to engage the gasket of a hand operated pipe coupling half section and provided with a fixed locking flange for engaging one of the locking flanges of said hand operated coupling, and a movable locking lever, pivoted on the first named pipe section and movable on an axis coincident with the axis of the pipe section, said lever being provided with a locking flange adapted to be moved into engagement with another locking flange of the hand operated coupling to couple the parts together.

2. An interchange coupling device comprising a pipe section having a seat adapted to engage the gasket of a hand operated pipe coupling half section and provided with a fixed locking flange for engaging one of the locking flanges of said hand operated coupling, a movable locking lever provided with a locking flange adapted to be moved into engagement with another locking flange of the hand operated coupling to couple the parts together, and means for locking said lever in coupling position.

3. An interchange coupling device comprising a pipe section having a seat adapted to engage the gasket of a hand operated pipe coupling half section and provided with a fixed locking flange for engaging one of the locking flanges of said hand operated coupling, a movable locking lever provided with a locking flange adapted to be moved about the axis of the pipe section into engagement with another locking flange of the hand operated coupling to couple the parts together, and coöperating locking surfaces provided respectively on the pipe section and lever for preventing movement of the lever from coupling position, said coöperating locking surfaces movable into engagement by movement of the lever into coupling position.

4. An interchange coupling device comprising a pipe section having a seat adapted to engage the gasket of a hand operated pipe coupling half section and provided with a fixed locking flange for engaging one of the locking flanges of said hand operated coupling, a movable locking lever provided with a locking flange adapted to be moved about the axis of the pipe section into engagement with another locking flange of the hand operated coupling to couple the parts together, and coöperating locking means provided respectively on the pipe section and lever for preventing movement of the lever from coupling position, said coöperating locking means movable into locking engagement by movement of the lever into coupling position.

5. An interchange coupling device comprising a pipe section having a seat adapted to engage the gasket of a hand operated pipe coupling half section and provided with a fixed locking flange for engaging one of the locking flanges of said hand operated coupling, a movable locking lever provided with a locking flange adapted to be moved into engagement with another locking flange of the hand operated coupling to couple the parts together, and coöperating locking surfaces provided respectively on the pipe section and lever for preventing movement of the lever from coupling position, said coöperating locking surfaces movable into locking engagement by movement of the lever into coupling position, and positioned to be forced into firm locking engagement by pressure within the hand operated coupling.

6. An interchange coupling device comprising a pipe section having a seat adapted to engage the gasket of an ordinary hand operated pipe coupling half section provided with the usual opposed outer and inner coupling flanges, said pipe section also having a fixed locking flange adapted to engage the outer coupling flange of the hand operated coupling, and a manually operated lever having a locking flange adapted to engage the inner coupling flange of said hand operated coupling.

7. An interchange coupling device comprising a pipe section having a seat adapted to engage the gasket of a hand operated pipe coupling half section and provided with a fixed locking flange for engaging one of the locking flanges of said hand operated coupling, a movable locking lever provided with a locking flange adapted to be moved about the axis of the pipe section into engagement with another locking flange of the hand operated coupling to couple the parts together, and coöperating corrugated locking surfaces provided respectively on the pipe section and lever adapted to be brought into engagement by movement of the lever into coupling position.

8. An interchange coupling device comprising a pipe section having a seat adapted to engage the gasket of an ordinary hand operated pipe coupling half section, a manually operated lever locking member for coupling the hand operated coupling to said pipe section, and coöperating locking surfaces provided respectively on the pipe section and lever for preventing movement of the lever from coupling position, said coöperating locking surfaces being adapted to be brought into locking engagement by movement of the lever about the axis of the pipe section into coupling position.

9. An interchange coupling device comprising a pipe section having a seat adapted to engage the gasket of an ordinary hand operated pipe coupling half section, a manually operated lever locking member for coupling the hand operated coupling to said pipe section, and coöperating corrugated locking surfaces provided respectively on the pipe section and lever adapted to be brought into engagement by movement of the lever into coupling position.

10. An interchange coupling device comprising a pipe section having a seat adapted to engage the gasket of an ordinary hand operated pipe coupling half section, a manually operated lever locking member for coupling the hand operated coupling to said pipe section, and coöperating locking surfaces provided respectively on the pipe section and lever for preventing movement of the lever from coupling position and adapted to be brought into engagement by movement of the lever into coupling position and positioned to be forced into firm locking engagement by pressure within the hand operated coupling.

11. An interchange coupling device comprising a pipe section having a seat adapted to engage the gasket of a hand operated pipe coupling half section and provided with a fixed locking flange for engaging one of the locking flanges of said hand operated coupling, and a movable locking lever having a locking flange adapted to be moved into engagement with another locking flange of the hand operated coupling and provided with a hook for engaging a pin of said hand operated coupling.

12. An interchange coupling device comprising a pipe section having a seat adapted to engage the gasket of a hand operated pipe coupling half section and provided with a fixed locking flange for engaging one of the locking flanges of said hand operated coupling, a movable locking lever having a locking flange adapted to be moved into engagement with another locking flange of the hand operated coupling and provided with a hook for engaging a pin of said hand operated coupling, and coöperating locking surfaces provided respectively on the pipe section and lever adapted to be brought into engagement by movement of the lever into coupling position.

13. An interchange coupling device comprising a pipe section adapted to form a coupling engagement with a hand operated coupling half section, a locking lever member rotatably mounted on said pipe section for locking the parts in coupling engagement, a lug on the pipe section, said lever member having a notch positioned on the lever to register with the lug when the lever is in a position remote from coupling position to permit detachment of the lever from its pipe section, and coöperating lugs mounted respectively on the lever and pipe section for limiting the movement of the lever in moving it into detaching position.

14. The combination with a pipe section connected to an automatic pipe coupling half section and provided with a fixed locking flange, and an ordinary hand operated coupling half section connected to a train pipe and having the usual inner and outer locking flanges, the outer locking flange being adapted to engage the fixed locking flange of said pipe section, of a lever and a locking flange adapted by a movement of the lever to engage the inner locking flange of the hand operated coupling to clamp the latter into engagement with the pipe section.

15. The combination with a pipe section connected to an automatic pipe coupling half section and provided with a fixed locking flange and an ordinary hand operated coupling half section connected to a train pipe and having the usual inner and outer locking flanges, the outer locking flange being adapted to engage the fixed locking flange of said pipe section, of a lever and a locking flange adapted by a movement of the lever to engage the inner locking flange of the hand operated coupling to clamp the latter into engagement with the pipe section, and means for locking the lever in coupling position.

16. The combination with a pipe section connected to an automatic pipe coupling half section and provided with a fixed locking flange and an ordinary hand operated coupling half section connected to a train pipe and having the usual inner and outer locking flanges, the outer locking flange being adapted to engage the fixed locking flange of said pipe section, of a lever and a locking flange adapted by a movement of the lever to engage the inner locking flange of the hand operated coupling to clamp the latter into engagement with the pipe section, and coöperating locking members provided respectively on the pipe section and lever adapted to be brought into engagement by movement of the lever into coupling position.

17. The combination with a pipe section connected to an automatic pipe coupling half section and provided with a fixed locking flange and an ordinary hand operated coupling half section connected to a train pipe and having the usual inner and outer locking flanges, the outer locking flange being adapted to engage the fixed locking flange of said pipe section, of a lever and a locking flange adapted by a movement of the lever to engage the inner locking flange of the hand operated coupling to clamp the latter into engagement with the pipe section, and coöperating corrugated locking surfaces provided respectively on the pipe section and lever adapted to be brought into engagement by movement of the lever into coupling position.

LEONIDAS D. WOODRUFF.

Copies of this patent may be obtained for five cents each, by addressing the "Commissioner of Patents, Washington, D. C."